United States Patent
Pan et al.

(10) Patent No.: US 12,218,729 B2
(45) Date of Patent: Feb. 4, 2025

(54) SYSTEMS AND METHODS FOR UPLINK TRANSMISSION

(71) Applicant: ZTE CORPORATION, Guangdong (CN)

(72) Inventors: Yu Pan, Shenzhen (CN); Chuangxin Jiang, Shenzhen (CN); Zhaohua Lu, Shenzhen (CN); Ke Yao, Shenzhen (CN); Yang Zhang, Shenzhen (CN); Shujuan Zhang, Shenzhen (CN); Zhen He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 352 days.

(21) Appl. No.: 17/853,125

(22) Filed: Jun. 29, 2022

(65) Prior Publication Data

US 2022/0329310 A1 Oct. 13, 2022

Related U.S. Application Data

(63) Continuation of application No. PCT/CN2019/130329, filed on Dec. 31, 2019.

(51) Int. Cl.
*H04B 7/0456* (2017.01)
*H04B 7/06* (2006.01)
(Continued)

(52) U.S. Cl.
CPC ......... *H04B 7/0639* (2013.01); *H04B 7/0456* (2013.01); *H04W 72/1268* (2013.01); *H04W 72/23* (2023.01); *H04L 1/08* (2013.01)

(58) Field of Classification Search
None
See application file for complete search history.

(56) References Cited

U.S. PATENT DOCUMENTS

2019/0081671 A1* 3/2019 Yang ................ H04B 7/0482
2019/0082456 A1 3/2019 Kim et al.

FOREIGN PATENT DOCUMENTS

CN 109511170 A 3/2019
CN 110535499 A 12/2019
(Continued)

OTHER PUBLICATIONS

"3rd Generation Partnership Project; Technical Specification Group Radio Access Network; NR; Multiplexing and channel coding (Release 15)", 3GPP Draft; 38212-F8, France, Dec. 15, 2019 (101 pages).

(Continued)

*Primary Examiner* — Minh Trang T Nguyen
(74) *Attorney, Agent, or Firm* — Foley & Lardner LLP

(57) ABSTRACT

Systems and methods for wireless communications are disclosed herein. A base station sends, to a wireless communication device, a first number of Transmitted Precoding Matrix Indicators (TPMI) codewords corresponding to a second number of codebook-based uplink transmissions of the wireless communication device. The first number being greater or equal to 1. The second number being greater or equal to 1. The first number of TPMI codewords correspond to an uplink transmission set. The uplink transmission set including the second number of the uplink transmissions. The base station receives, from the wireless communication device, the codebook-based uplink transmissions transmitted based on the TPMI codewords.

13 Claims, 12 Drawing Sheets

(51) Int. Cl.
     *H04W 72/1268* (2023.01)
     *H04W 72/23*   (2023.01)
     *H04L 1/08*    (2006.01)

(56) References Cited

FOREIGN PATENT DOCUMENTS

| CN | 110535589 A     | 12/2019 |
|----|-----------------|---------|
| CN | 110536452 A     | 12/2019 |
| CN | 110572193 A     | 12/2019 |
| EP | 3 925 368 A1    | 12/2021 |
| JP | 2019-118035 A   | 7/2019  |
| WO | WO-2019/028834 A1 | 2/2019 |

OTHER PUBLICATIONS

Extended European Search Report for EP Appln. No. 19952223.6 dated Mar. 8, 2023 (11 pages).

Interdigital Inc.: "TPMI for Codebook-based UL Transmission" 3GPP TSG RAN WGI Meeting 91; RI-1720625; Dec. 1, 2017 (Dec. 1, 2017) Reno, Nevada (5 pages).

International Search Report and Written Opinion for PCT Appl. No. PCT/CN2019/130329 mailed Sep. 27, 2020 (8 pages).

3GPP, "3rd Generation Partnership Project; Technical Specification Group Radio Access Network; NR; Multiplexing and channel coding (Release 15)", 3GPP TS 38.212, V15.7.0, Sep. 28, 2019, pp. 76-81 (7 pages).

First Japanese Office Action on JP Appl No. 2022-539675, dated Aug. 30, 2023 (11 pages, including English translation).

NTT DOCOMO, Inc, "Enhancements on multi-TRP/panel transmission", 3GPP TSG RAN WG1 #98bis R1-1911184, Chongqing, China, Oct. 20, 2019 (33 pages).

First Office Action for CN Appl. No. 201980102551.X, dated Sep. 16, 2023 (with English translation, 22 pages).

Interdigital Inc., "TPMI for Codebook-based UL Transmission", 3GPP TSG RAN WG1 Meeting 91, R1-1720625, Reno, Nevada, US, Dec. 1, 2017 (5 pages).

* cited by examiner

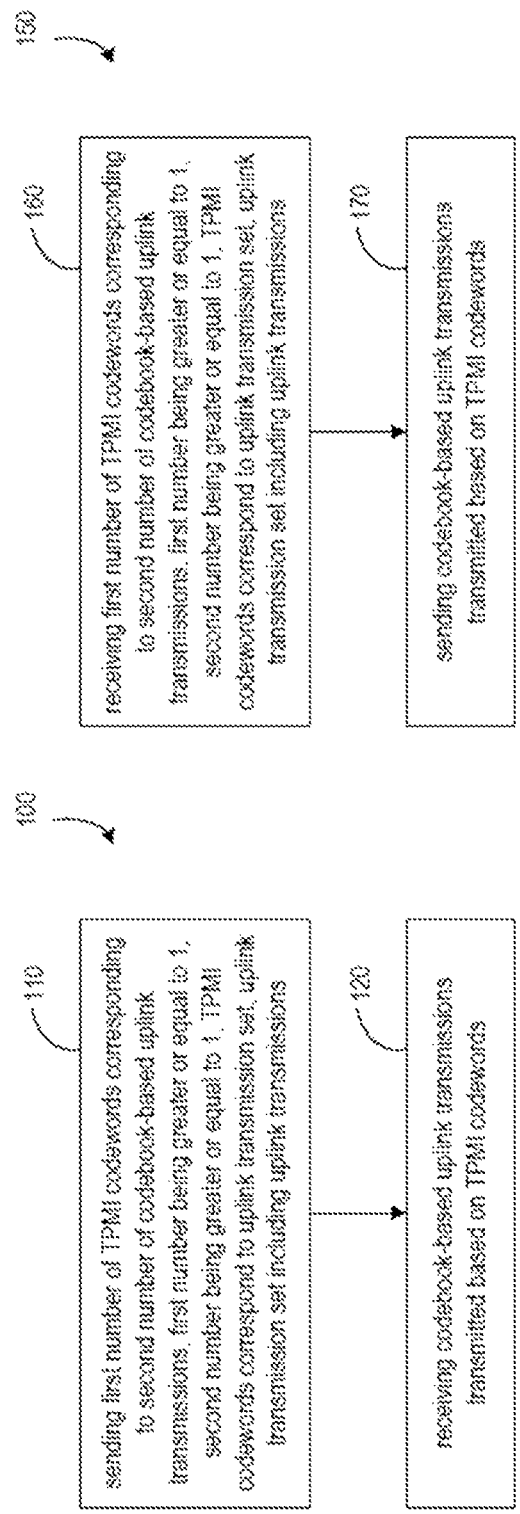

| Bit field mapped to index | codebookSubset = fullyAndPartialAndNonCoherent | Bit field mapped to index | codebookSubset = nonCoherent |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 1 layer: TPMI=0,1 | 2 | 1 layer: TPMI=0,1 |
| 3 | 1 layer: TPMI=2 | | |
| 4 | 1 layer: TPMI=3 | | |
| 5 | 1 layer: TPMI=4 | | |
| 6 | 1 layer: TPMI=5 | | |
| 7 | 1 layer: TPMI=2,3 | | |
| 8 | 1 layer: TPMI=2,4 | | |
| 9 | 1 layer: TPMI=2,5 | | |
| 10 | 1 layer: TPMI=3,4 | | |
| 11 | 1 layer: TPMI=3,5 | | |
| 12 | 1 layer: TPMI=4,5 | | |
| 13-15 | reserved | | |

Precoding information and number of layers, for 2 antenna ports, if transform precoder is enabled, or if transform precoder is disabled and maxRank = 1

FIG. 2

| TPMI index | W (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | - | - | - | - |

Precoding matrix W for single-layer transmission using four antenna ports with transform precoding disabled

FIG. 3

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 1 layer: TPMI=0,2 | 4 | 1 layer: TPMI=0,2 | 4 | 1 layer: TPMI=0,2 |
| 5 | 1 layer: TPMI=0,3 | 5 | 1 layer: TPMI=0,3 | 5 | 1 layer: TPMI=0,3 |
| 6 | 1 layer: TPMI=1,2 | 6 | 1 layer: TPMI=1,2 | 6 | 1 layer: TPMI=1,2 |
| 7 | 1 layer: TPMI=1,3 | 7 | 1 layer: TPMI=1,3 | 7 | 1 layer: TPMI=1,3 |
| 8 | 1 layer: TPMI=4 | 8 | 1 layer: TPMI=4 | | |
| ... | ... | ... | ... | | |
| 15 | 1 layer: TPMI=11 | 15 | 1 layer: TPMI=11 | | |
| 16 | 1 layer: TPMI=4,9 | 16 | 1 layer: TPMI=4,9 | | |
| ... | ... | ... | ... | | |
| 31 | 1 layer: TPMI=7,11 | 19 | 1 layer: TPMI=4,11 | | |
| 32 | 1 layer: TPMI=12 | 20 | 1 layer: TPMI=5,8 | | |
| ... | ... | ... | ... | | |
| 47 | 1 layer: TPMI=27 | 23 | 1 layer: TPMI=5,11 | | |
| 48 | 1 layer: TPMI=12,13 | ... | ... | | |
| 49 | 1 layer: TPMI=14,15 | 28 | 1 layer: TPMI=7,8 | | |
| ... | ... | ... | ... | | |
| 55 | 1 layer: TPMI=26,27 | 31 | 1 layer: TPMI=7,11 | | |
| 56-63 | reserved | | | | |

Precoding information and number of layers for 4 antenna ports, if transform precoder is enabled, or if transform precoder is disabled and maxRank = 1

FIG. 4

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 1 layer: TPMI=4 | 4 | 1 layer: TPMI=4 | | |
| ... | ... | ... | ... | | |
| 11 | 1 layers: TPMI=11 | 11 | 1 layer: TPMI=11 | | |
| 12 | 1 layers: TPMI=12 | 12-15 | reserved | | |
| 13 | 1 layers: TPMI=13 | | | | |
| ... | ... | | | | |
| 27 | 1 layers: TPMI=27 | | | | |
| 28-31 | reserved | | | | |

Precoding information and number of layers for 4 antenna ports, if transform precoder is enabled, or if transform precoder is disabled and maxRank = 1

FIG. 6

Table 1000:

| Bit field mapped to index | codebookSubset = fullyAndPartialAndNonCoherent | codebookSubset = nonCoherent |
|---|---|---|
| 0 | 1 layer: TPMI=0 | 1 layer: TPMI=0 |
| 1 | 1 layer: TPMI=1 | 1 layer: TPMI=1 |
| 2 | 1 layer: TPMI=2 | |
| 3 | 1 layer: TPMI=3 | |
| 4 | 1 layer: TPMI=4 | |
| 5 | 1 layer: TPMI=5 | |
| 6-7 | reserved | |

Precoding information and number of layers, for 2 antenna ports, if transform precoder is enabled, or if transform precoder is disabled and maxRank = 1

FIG. 10

Table 1100:

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

Antenna port(s), transform precoder is disabled, dmrs-Type=1, maxLength=1, rank = 1

FIG. 11

SYSTEMS AND METHODS FOR UPLINK TRANSMISSION

CROSS-REFERENCE TO RELATED APPLICATION

This application claims the benefit of priority under 35 U.S.C. § 120 as a continuation of PCT Patent Application No. PCT/CN2019/130329, filed on Dec. 31, 2019, the disclosure of which is incorporated herein by reference in its entirety.

TECHNICAL FIELD

The present disclosure relates to the field of telecommunications, and in particular, to uplink transmission from a wireless communication device to base stations.

BACKGROUND

In conventional codebook-based uplink transmission, a same Transmitted Precoding Matrix Indicator (TPMI) is used each time uplink data on a Physical Uplink Shared Channel (PUSCH) of a set of PUSCH transmissions is transmitted. The TPMI can be indicated by a TPMI field in Downlink Control Information (DCI).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a base station sends, to a wireless communication device, a first number of TPMI codewords corresponding to a second number of codebook-based uplink transmissions (PUSCH transmissions) of the wireless communication device. The first number being greater or equal to 1. The second number being greater or equal to 1. The first number of TPMI codewords correspond to an uplink transmission set. The uplink transmission set including the second number of the uplink transmissions. The base station receives, from the wireless communication device, the codebook-based uplink transmissions transmitted based on the TPMI codewords.

In some embodiments, the wireless communication device receives, from a base station, a first number of TPMI codewords corresponding to a second number of codebook-based uplink transmissions of the wireless communication device. The first number is greater or equal to 1. The second number is greater or equal to 1. The first number of TPMI codewords correspond to an uplink transmission set. The uplink transmission set includes the second number of the uplink transmissions. The wireless communication device sends, to the base station, the codebook-based uplink transmissions transmitted based on the TPMI codewords.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 1A is a flowchart diagram illustrating an example indication method, in accordance with some embodiments of the present disclosure;

FIG. 1B is a flowchart diagram illustrating an example indication method, in accordance with some embodiments of the present disclosure;

FIG. 2 is an example table illustrating precoding information and a number of layers, according to some embodiments of the present disclosure;

FIG. 3 is an example table illustrating precoding matrix W for single-layer transmission, according to some embodiments of the present disclosure;

FIG. 4 is an example table illustrating precoding information and a number of layers, according to some embodiments of the present disclosure;

FIG. 6 is an example table illustrating precoding information and a number of layers, according to some embodiments of the present disclosure;

FIG. 10 is an example table illustrating precoding information and a number of layers, for 2 antenna ports, according to some embodiments of the present disclosure;

FIG. 11 is an example table illustrating antenna port information, according to some embodiments of the present disclosure;

DETAILED DESCRIPTION

Figure 5:
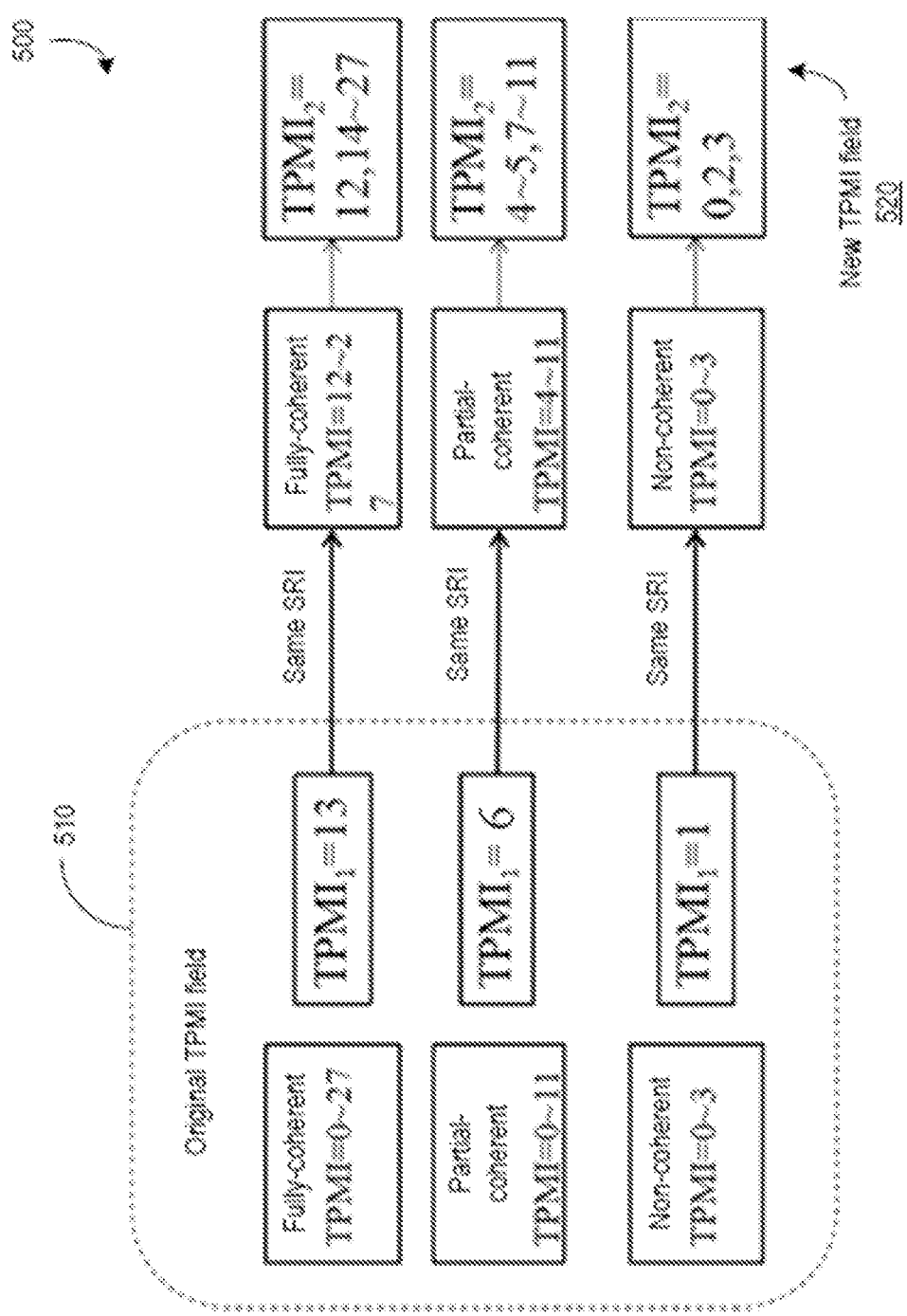
FIG. 5 is an example diagram illustrating a first TPMI field and a second TPMI field of DCI, according to some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The present disclosure addresses the issue of uplink TPMI lacking diversity gain, given that in conventional codebook-based uplink transmission, a same TPMI is used each time uplink data on a PUSCH is transmitted. The lack of diversity gain causes the network side (including one or more base stations) to receive uplink data inaccurately. Using different TPMIs for different PUSCH transmissions can increase the diversity gain of PUSCH transmissions, thus effectively improving the accuracy of the data received by the base stations. The present disclosure describes various indication methods for using different TPMIs for different PUSCH transmissions.

FIG. 1A is a flowchart diagram illustrating an example indication method 100, in accordance with some embodiments of the present disclosure. Referring to FIG. 1A, at 110, a network side (e.g., a base station) sends to a UE a first number (K) of TPMI codewords corresponding to a second number (M) of codebook-based uplink transmissions of the UE. The first number being greater or equal to 1. The second number being greater or equal to 1. The first number of TPMI codewords correspond to an uplink transmission set. The uplink transmission set including the second number of the uplink transmissions.

In some embodiments, the TPMI codewords correspond to precoding matrices used in Frequency-Division Multiplexing (FDM) and/or Time-Division Multiplexing (TDM) of the uplink transmissions.

In some embodiments, the first number is 2. A maximum uplink transmission layer is 1. The uplink transmissions of the uplink transmission set are grouped into a first uplink transmission set and a second uplink transmission set. A first TPMI codeword of the TPMI codewords corresponds to the first uplink transmission set. A second TPMI codeword of the TPMI codewords corresponds to the second uplink transmission set.

In some embodiments, the base station indicates the TPMI codewords using a TPMI field corresponding to a code point, and the code point indicates two different TPMI codewords. In some embodiments, for the UE having 4 antennas, available TPMI codewords are grouped into a first TPMI group and a second TPMI group. In some examples, the first TPMI codeword and the second TPMI codeword are both from the first TPMI group or the second TPMI group. In other examples, the first TPMI codeword is from the first TPMI group, and the second TPMI codeword is from the second TPMI group.

In some embodiments, the available TPMI codewords are grouped according to index values for the available TPMI codewords. For antenna non-coherent transmissions and antenna partial coherent transmissions, a first half of the index values are grouped in the first TPMI group, and a second half of the index values are grouped in the second TPMI group. For antenna fully coherent transmissions, the first TPMI group includes alternating groups of two adjacent TPMI index values, and the second TPMI group includes other alternating groups of two adjacent TPMI index values.

In some embodiments, the base station sends the TPMI codewords in DCI. The DCI includes a first field containing a value for the first TPMI codeword and a second field containing a value for the second TPMI codeword. In some examples, the second field corresponds to a plurality of tables. The plurality of tables correspond to different antenna attributes of the UE. The antenna attributes include one of non-coherent, partially coherent, or fully coherent. The second TPMI codeword corresponds to the antenna attributes of the UE.

In some embodiments, the uplink transmissions correspond to a same SpatialRelationInfo, and the second TPMI codeword and the first TPMI codeword are different. In some embodiments, the uplink transmissions correspond to different SpatialRelationInfo, and the second TPMI codeword and the first TPMI codeword are same or different.

In some embodiments, the second TPMI codeword is determined from an the first TPMI codeword and an offset value. In some embodiments, the offset value is configured via signaling. The signaling includes one of Radio Resource Control (RRC) signaling or Medium Access Control (MAC) Control Element (CE). The second TPMI codeword is within a same antenna attribute range as that of the first TPMI codeword.

In some embodiments, the second TPMI codeword is sent as an antenna port field of DCI for the UE having 2 antennas. In some embodiments, an index value of the antenna port field corresponds to an index value of the second TPMI codeword. The second TPMI codeword is within a same antenna attribute range as that of the first TPMI codeword.

In some embodiments, the first TPMI codeword, as determined based on uplink channel measurement report, enables uplink full power transmission, and the second TPMI codeword is selected from one or more TPMI codewords that enable the uplink full power transmission. In some embodiments, the first TPMI codeword, as determined based on the uplink channel measurement report, cannot enable uplink full power transmission, and the second TPMI codeword is selected from one or more TPMI codewords that cannot enable the uplink full power transmission. In some embodiments, regardless of whether the first TPMI codeword enables the uplink full power transmission, the second TPMI codeword is selected from the one or more TPMI codewords that enable uplink full power transmission.

In some embodiments, the UE supports mode 1. In some examples, the UE supports non-coherent transmissions, the second TPMI codeword being TPMI=13. In some examples, the UE supports partial coherent transmissions, the second TPMI codeword being selected from one of TPMI=12, TPMI=13, TPMI=14, TPMI=15, TPMI=16, TPMI=17, TPMI=18, or TPMI=19.

In some examples, the UE supports mode 2. The second TPMI codeword is selected from one or more TPMI codewords that support full power transmission. One or more TPMI codewords that support full power transmission are received from the UE.

In some embodiments, in response to determining that the uplink transmissions correspond to a same SpatialRelationInfo, the uplink transmissions of the uplink transmission set is grouped into a first uplink transmission set and a second uplink transmission set by at least one of (1) grouping a first half the uplink transmissions as the first uplink transmission set, and grouping a second half of the uplink transmissions as the second uplink transmission set; (2) grouping odd uplink transmissions of the uplink transmissions as the first uplink transmission set, and grouping even uplink transmissions of the uplink transmissions as the second uplink transmission set; or (3) grouping first and second uplink transmissions, fifth and sixth uplink transmissions . . . of the uplink transmissions as the first uplink transmission set, and grouping third and fourth uplink transmissions, seventh and eighth uplink transmissions . . . of the uplink transmissions as the second uplink transmission set.

In some embodiments, in response to determining that the uplink transmissions correspond to two different SpatialRelationInfo including a first SpatialRelationInfo and a second SpatialRelationInfo, the uplink transmissions of the uplink transmission set are grouped into a first uplink transmission set and a second uplink transmission set by grouping those of the uplink transmissions to which the first SpatialRelationInfo is applied in the first uplink transmission set, and those of the uplink transmissions to which the second SpatialRelationInfo is applied are grouped in the second uplink transmission set.

In some embodiments, the TPMI codewords includes a first TPMI codeword and one or more second TPMI codewords. The one or more second TPMI codewords are selected within a TPMI codeword range. In some examples, the TPMI codeword range is determined based on UE antenna attributes or classification in a TPMI codebook table. In some examples, the uplink transmissions correspond to same SpatialRelationInfo. The base station indicates the first TPMI codeword to the UE via DCI, the first TPMI codeword corresponds to a first uplink transmission of a first set of the uplink transmissions. The one or more second TPMI codewords are selected from a codebook table. The one or more second TPMI codewords are assigned to the other uplink transmissions of the uplink transmissions sequentially.

In some embodiments, the uplink transmissions correspond to a first SpatialRelationInfo and a second SpatialRelationInfo. The uplink transmission set includes a first uplink transmission set and a second uplink transmission set. In some examples, correspondence between the TPMI codewords and the uplink transmissions includes the first TPMI codeword being mapped to uplink transmission transmissions in the first uplink transmission set and a first uplink transmission in the second uplink transmission set, the one or more TPMI being mapped to remaining uplink transmissions in the second uplink transmission set, the one or more TPMI being selected from a codebook table sequentially. In some examples, correspondence between the TPMI codewords and the uplink transmissions includes the first TPMI codeword being mapped to a first uplink transmissions in the first uplink transmission set and the first uplink transmission in the second uplink transmission set, the one or more TPMI being mapped to remaining uplink transmissions in the first uplink transmission set and second uplink transmission set, the one or more TPMI being selected from a codebook table sequentially.

In some embodiments, the uplink transmissions are PUSCH transmissions. The uplink transmission set is a PUSCH transmission set. The uplink transmissions correspond to a same SpatialRelationInfo or different SpatialRelationInfo. the SpatialRelationInfo is determined from one of a Transmission Configuration Indicator (TCI) state, Spatial Relation Information (SRI), Sounding Reference Signal (SRS), Channel State Information Reference Signal (CSI-RS), or Synchronization Signal Block (SSB).

At 120, the network side (e.g., the base station) receives from the UE the codebook-based uplink transmissions transmitted based on the TPMI codewords.

FIG. 1B is a flowchart diagram illustrating an example indication method 150, in accordance with some embodiments of the present disclosure. Referring to FIGS. 1A and 1B, the method 150 is implemented by the UE of the method 100. At 160, the UE receives, from the network side (e.g., the base station), a first number K of TPMI codewords corresponding to a second number M of codebook-based uplink transmissions of the UE. The first number being greater or equal to 1. The second number being greater or equal to 1. The first number of TPMI codewords correspond to an uplink transmission set. The uplink transmission set including the second number of the uplink transmissions. At 170, the UE sends to the network side (e.g., the base station) the codebook-based uplink transmissions transmitted based on the TPMI codewords.

In some embodiments in which a maximum number of transmission layers supported by a UE is 1 (e.g., the UE implements single-layer transmissions, maxRank=1) for codebook-based uplink transmissions, a base station can indicate to or instruct the UE to perform M uplink PUSCH transmissions (e.g., codebook-based uplink transmissions) with multiple (e.g., 2) different TPMI codewords. A first TPMI codeword of the TMPI codewords corresponds to a first PUSCH set. A second TPMI codeword corresponds to a second PUSCH set. In other words, the PUSCH transmissions of the first PUSCH set can be transmitted by the UE to the base station using a precoding matrix corresponding to the first TPMI codeword, and the PUSCH transmissions of the second PUSCH set can be transmitted by the UE to the base station using a precoding matrix corresponding to the second TPMI codeword.

In some examples in which PUSCH transmissions correspond to the same SpatialRelationInfo, the PUSCH transmissions of a PUSCH set can be grouped using one of various suitable grouping methods, examples of which include but are not limited to, a first grouping method, a second grouping method, and a third grouping method.

In a first grouping method, the first PUSCH set includes the first half $$\left(e.g., \text{ the first}\frac{M}{2}\right)$$

PUSCH transmissions of the M transmissions, and the second PUSCH set includes the second half $$\left(e.g., \text{ the last}\frac{M}{2}\right)$$

PUSCH transmissions of the M transmissions.

In a second grouping method, the first PUSCH set includes odd (e.g., the first, the third, the fifth, and so on) PUSCH transmissions of the M transmissions, and the second PUSCH set includes even (e.g., the second, the fourth, the sixth, and so on) PUSCH transmissions of the M transmissions.

In a third grouping method, the first PUSCH set includes alternating groups of two adjacent PUSCH transmissions of the M transmissions, and the second PUSCH set includes other alternating groups of two adjacent PUSCH transmissions of the M transmissions. For example, the first PUSCH set includes the first and second PUSCH transmissions, the fifth and sixth transmissions, . . . , the (M−1)th and Mth PUSCH transmissions, and the second PUSCH set includes the third and fourth PUSCH transmissions, the seventh and eighth PUSCH transmissions, . . . , the (M−3)th and (M−2)th PUSCH transmissions.

In some examples in which the PUSCH transmissions correspond to two different spatial relationship information parameter (SpatialRelationInfo) (e.g., a first SpatialRelationInfo and a second SpatialRelationInfo), the first PUSCH set includes PUSCH transmissions to which the first SpatialRelationInfo is applied, and the second PUSCH set includes PUSCH transmissions to which the second SpatialRelationInfo is applied. The SpatialRelationInfo is determined from one of a TCI state, SRI, SRS, CSI-RS, or SSB.

FIG. 2 is an example table 200 illustrating precoding information and a number of layers, for 2 antenna ports, according to some embodiments. Referring to FIGS. 1A-2, the table 200 is a table for antenna with maxRank=1. The table 200 applies to a UE implementing single-layer transmission (maxRank=1) and having 2 antennas (e.g., 2 antenna ports) that are fully coherent, partial coherent, or non-coherent. Bit field mapped to index is a TPMI field index (TPMI index).

In some examples, the table 200 adds and modifies to Table 7.3.1.1.2-5 of 3GPP TS 38.212 version 15.3.0 Release 15 to allow the base station to indicate the TPMI codewords using a TPMI field corresponding to a code point, where the code point (corresponding to a TPMI index) indicates two different TPMI codewords.

In particular, in the column "codebookSubset=fullyAndPartialAndNonCoherent," information corresponding to TPMI indexes 2 (1 layer: TMPI=0,1), 7 (1 layer: TMPI=2,3), 8 (1 layer: TMPI=2,4), 9 (1 layer: TMPI=2,5), 10 (1 layer: TMPI=3,4), 11 (1 layer: TMPI=3,5), 12 (1 layer: TMPI=4,5) is included, and TPMI indexes 13-15 are reserved. In addition, in the column "codebookSubset=nonCoherent," information corresponding to TPMI index 2 (1 layer: TMPI=0,1) is included. Each TPMI index corresponds to a code point. Such information is collectively referred to as "added information."

As shown, the TPMI field illustrated by the table 200 is increased from 3 bits (used to indicate TPMI indexes 0-7) to 4 bits (used to indicate TPMI indexes 0-15). Each code point of the added information in the table 200 can be used to indicate 2 TPMI codewords. For example, 1 layer: TMPI=0,1 (TPMI index 2) is used to indicate TPMI codewords 0 and 1, 1 layer: TMPI=2,3 (TPMI index=7) is used to indicate TPMI codewords 2 and 3, and so on. Each of the 2 TPMI codewords corresponds to different PUSCH sets. In one example, a first TPMI codeword (identified by a number before the comma) corresponds to the first PUSCH set, and a second TPMI codeword (identified by a number after the comma) corresponds to the second PUSCH set.

In some examples in which a UE has 2 coherent antennas and implements single layer transmission (e.g., the table 200 applies), the UE can receive, from a base station, a TPMI index value of 7 for 8 uplink PUSCH transmissions (e.g., M=8). The uplink PUSCH transmissions is a sequence of 8 uplink transmissions, from a first PUSCH transmission to an eighth PUSCH transmission. According to the table 200, the first PUSCH set (including some of the uplink PUSCH transmissions) corresponds to TPMI=2, and the second PUSCH set (including others of the uplink PUSCH transmissions) corresponds to TPMI=3. The first PUSCH set is transmitted using a precoding matrix corresponding to TPMI=2, and the second PUSCH set is transmitted using a precoding matrix corresponding to TPMI=3.

In an example in which the PUSCH transmissions correspond to the same SpatialRelationInfo, the PUSCH set can be divided or grouped using the first grouping method. In that regard, the first PUSCH set (including the first, second, third, and fourth PUSCH transmissions) corresponds to TPMI=2, and the second PUSCH set (including the fifth, sixth, seventh, and eighth PUSCH transmissions) corresponds to TPMI=3. The first PUSCH set is transmitted using a precoding matrix corresponding to TPMI=2, and the second PUSCH set is transmitted using a precoding matrix corresponding to TPMI=3.

In an example in which the PUSCH transmissions correspond to the same SpatialRelationInfo, the PUSCH set can be divided or grouped using the second grouping method. In that regard, the first PUSCH set (including the first, third, fifth, and seventh PUSCH transmissions) corresponds to TPMI=2, and the second PUSCH set (including the second, fourth, sixth, and eighth PUSCH transmissions) corresponds to TPMI=3. The first PUSCH set is transmitted using a precoding matrix corresponding to TPMI=2, and the second PUSCH set is transmitted using a precoding matrix corresponding to TPMI=3.

In an example in which the PUSCH transmissions correspond to the same SpatialRelationInfo, and the PUSCH set is divided using the third grouping method, the first PUSCH set (including the first, second, fifth, and sixth PUSCH transmissions) corresponds to TPMI=2, and the second PUSCH set (including the third, fourth, seventh, and eighth PUSCH transmissions) corresponds to TPMI=3.

A precoding matrix corresponds to or is identified by a TPMI codeword. In some embodiments, for 4-antenna, maxRank=1 uplink transmissions, the precoding matrices can be divided or grouped based on the index values of corresponding TPMI codewords. For antenna non-coherent transmissions and antenna partial coherent transmissions, all available TPMI codewords (and corresponding precoding matrices) are grouped according to index values for the TPMI codewords, such that to a first half of the index values (and corresponding precoding matrices) are grouped in a first TPMI group and a second half of the index values (and corresponding precoding matrices) are grouped in a second TPMI group. For antenna fully coherent transmissions, TPMI codewords (and corresponding precoding matrices) are grouped according to index values for the available TPMI codewords, such that the first TPMI group includes alternating groups of two adjacent TPMI index values, and the second TPMI group includes other alternating groups of two TPMI index values.

FIG. 3 is an example table 300 illustrating precoding matrix W for single-layer transmission (maxRank=1) using 4 antenna ports with transform precoding disabled, according to some embodiments. Referring to FIGS. 1A-3, the table 300 illustrates precoding matrices that correspond to TPMI indexes. The table 300 is a precoding matrix table applicable to 4 antennas and maxRank=1. In the tabled 300, precoding matrices for antenna non-coherent transmissions correspond to TPMI indexes 0-3, precoding matrices for antenna partial coherent transmissions correspond to TPMI indexes 4-11, precoding matrices for antenna fully coherent transmissions correspond to TPMI indexes 12-27. That is, in table 300, the available TPMI indexes for antenna non-coherent transmission are 0-3, the available TPMI indexes for antenna partial coherent transmission are 4-11, and the available TPMI indexes for antenna fully coherent transmission are 12-27.

The TPMI indexes corresponding to antenna non-coherent transmissions can be grouped such that the first half (e.g., TPMI indexes 0 and 1) of those TPMI indexes are grouped in the first TPMI group and the second half (e.g., TPMI indexes 2 and 3) of those TPMI indexes are grouped in the second TPMI group.

The TPMI indexes corresponding to antenna partial-coherent transmission can be grouped such that the first half (e.g., TPMI indexes 4-7) of those TPMI indexes are grouped in a first group and the second half (e.g., TPMI indexes 8-11) of those TPMI indexes are grouped in a second group.

The TPMI indexes corresponding to antenna fully-coherent transmission can be grouped such that the first half (e.g., TPMI indexes 12 and 13) of those TPMI indexes are grouped in a first group and the second half (e.g., TPMI indexes 14-15) of those TPMI indexes are grouped in a second group.

FIG. 4 is an example table 400 illustrating precoding information and a number of layers, for 4 antenna ports, according to some embodiments. Referring to FIGS. 1A-4, the table 400 is a table for antennas configured for maxRank=1. In some examples, the table 400 applies to a UE implementing single-layer transmission (maxRank=1) and having 4 antennas (e.g., 4 antenna ports) that are fully coherent, partial coherent, or non-coherent. Bit field mapped to index is a TPMI field index (TPMI index).

In some examples, the table 400 adds and modifies to Table 7.3.1.1.2-3 of 3GPP TS 38.212 version 15.3.0 Release 15 to allow the base station to indicate the TPMI codewords using a TPMI field corresponding to a code point, where the code point indicates two different TPMI codewords.

In particular, in the column "codebookSubset=fullyAndPartialAndNonCoherent," information corresponding to TPMI indexes 4-7 (respectively, 1 layer: TMPI=0,2; 1 layer: TMPI=0,3; 1 layer: TMPI=1,2; 1 layer: TMPI=1,3), TPMI indexes 16-31 (respectively, 1 layer: TMPI=4,8-1 layer: TMPI=7,11), and TPMI indexes 48-55 (respectively, 1 layer: TMPI=12,13-1 layer: TMPI=26,27) is included and TPMI indexes 56-63 are reserved. Moreover, in the column "codebookSubset=partialAndNonCoherent," information corresponding to TPMI indexes 4-7 (respectively, 1 layer: TMPI=0,2; 1 layer: TMPI=0,3; 1 layer: TMPI=1,2; 1 layer: TMPI=1,3) and TPMI indexes 16-31 (respectively, 1 layer: TMPI=4,8-1 layer: TMPI=7,11) is included. In addition, in the column "codebookSubset=nonCoherent," information corresponding to TPMI indexes 4-7 (respectively, 1 layer: TMPI=0,2; 1 layer: TMPI=0,3; 1 layer: TMPI=1,2; 1 layer: TMPI=1,3) is included. Each TPMI field corresponds to a code point. Such information is collectively referred to as added information.

As shown, the TPMI field illustrated by the table 400 is increased from 5 bits (used to indicate TPMI indexes 0-31) to 6 bits (used to indicate TPMI indexes 0-63). Each code point of the added information in the table 400 can be used to indicate 2 TPMI codewords. For example, 1 layer: TMPI=0,2 (TPMI index 4) is used to indicate TPMI codewords 0 and 2, and so on. The first TPMI codeword of the 2 different TMPI codewords corresponds to a first PUSCH set, and the second TPMI codeword corresponds to a second PUSCH set.

With respect to a 4-antenna UE, for antenna non-coherent transmission and antenna partial coherent transmission, the TPMI codewords are from different TPMI groups (e.g., the first TPMI codeword is from the first TPMI group, and the second TPMI codeword is from the second TPMI group). For antenna fully coherent transmission, the TPMI codewords are from a same TPMI group (e.g., the first TPMI group or the second TPMI group).

Illustrating with an example in which a UE has 4 coherent antennas and implements single layer transmission (e.g., the table 400 applies), the UE can receive, from a base station, a TPMI index value of 48 for 8 uplink PUSCH transmissions (e.g., M=8). The uplink PUSCH transmissions is a sequence of 8 uplink transmissions, from a first PUSCH transmission to an eighth PUSCH transmission. According to the table 400, the first PUSCH set corresponds to TPMI=12, and the second PUSCH set corresponds to TPMI=13. The first PUSCH set is transmitted using a precoding matrix corresponding to TPMI=12, and the second PUSCH set is transmitted using a precoding matrix corresponding to TPMI=13.

In an example in which the PUSCH transmissions correspond to the same SpatialRelationInfo, and the PUSCH set is divided using the first grouping method, the first PUSCH set (including the first, second, third, and fourth PUSCH transmissions) corresponds to TPMI=12, and the second PUSCH set (including the fifth, sixth, seventh, and eighth PUSCH transmissions) corresponds to TPMI=13.

In an example in which the PUSCH transmissions correspond to the same SpatialRelationInfo, and the PUSCH set is divided using the second grouping method, the first PUSCH set (including the first, third, fifth, and seventh PUSCH transmissions) corresponds to TPMI=12, and the second PUSCH set (including the second, fourth, sixth, and eighth PUSCH transmissions) corresponds to TPMI=13.

In an example in which the PUSCH transmissions correspond to the same SpatialRelationInfo, and the PUSCH set is divided using the third grouping method, the first PUSCH set (including the first, second, fifth, and sixth PUSCH transmissions) corresponds to TPMI=12, and the second PUSCH set (including the third, fourth, seventh, and eighth PUSCH transmissions) corresponds to TPMI=13.

Accordingly, in the embodiments described with reference to tables 200 and 400, the same TPMI field (e.g., a same code point) can be used to indicate two different TPMI codewords applied to a same PUSCH set.

In some embodiments, the first TPMI codeword is indicated by an original TPMI field in the DCI, and the second TPMI codeword can be indicated by a new field added to the DCI. In some examples, the new field can be split into different tables according to antenna attributes of the UE, such that the antenna attributes of the UE can be mapped to the TPMI codeword.

In an example in which the UE includes an antenna having fully coherent transmission capabilities, the UE can select one TPMI codeword among multiple TPMI codewords that correspond to fully coherent antennas and cannot select any TPMI codewords corresponding to partially coherent or non-coherent antennas. The PUSCH set can be divided into the first PUSCH set and the second PUISC set using one of the grouping methods (e.g., the first, second, and third grouping methods) to correspond to the first TPMI codeword and the second TPMI codeword in the manner described. The first TPMI corresponds to the first PUSCH set, and the second TPMI corresponds to the second PUSCH set.

In the examples in which the PUSCH transmissions correspond to the same SpatialRelationInfo, the second TPMI codeword is selected from a table (corresponding antenna attributes of the UE) in the new field of the DCI, where the second TPMI codeword has a different value than that of the first TPMI codeword. In the examples in which the PUSCH transmissions correspond to different SpatialRelationInfo, the second TPMI codeword is selected from a table (corresponding antenna attributes of the UE) in the new field of the DCI, where the second TPMI codeword has a same or a different value than that of the first TPMI codeword.

Figure 8:
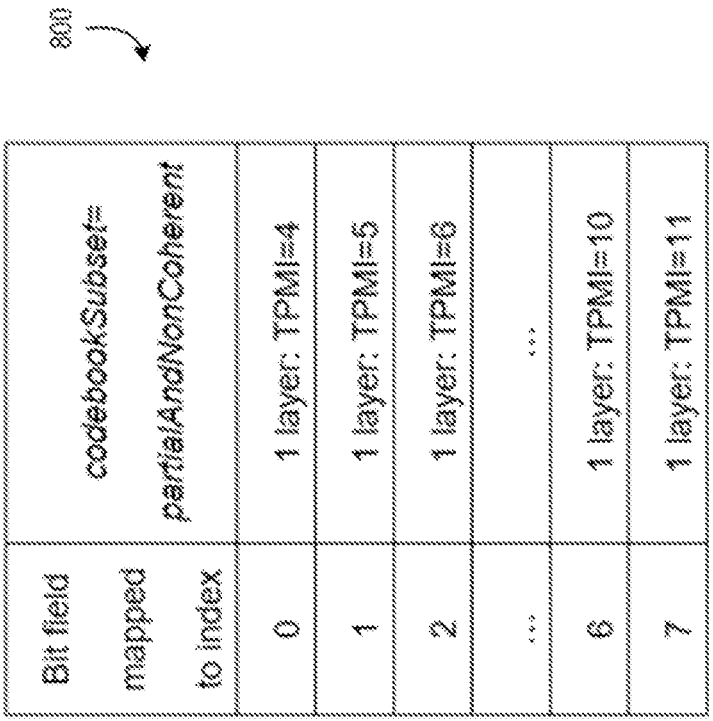
FIG. 8 is an example table illustrating precoding information and a number of layers, according to some embodiments of the present disclosure.
Figure 7:
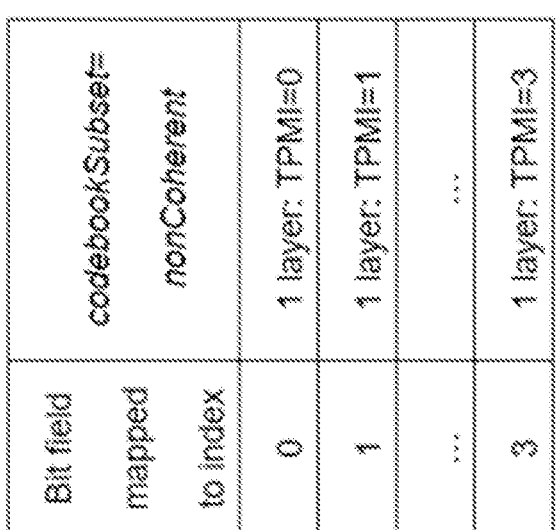
FIG. 7 is an example table illustrating precoding information and a number of layers, according to some embodiments of the present disclosure.
Figure 9:
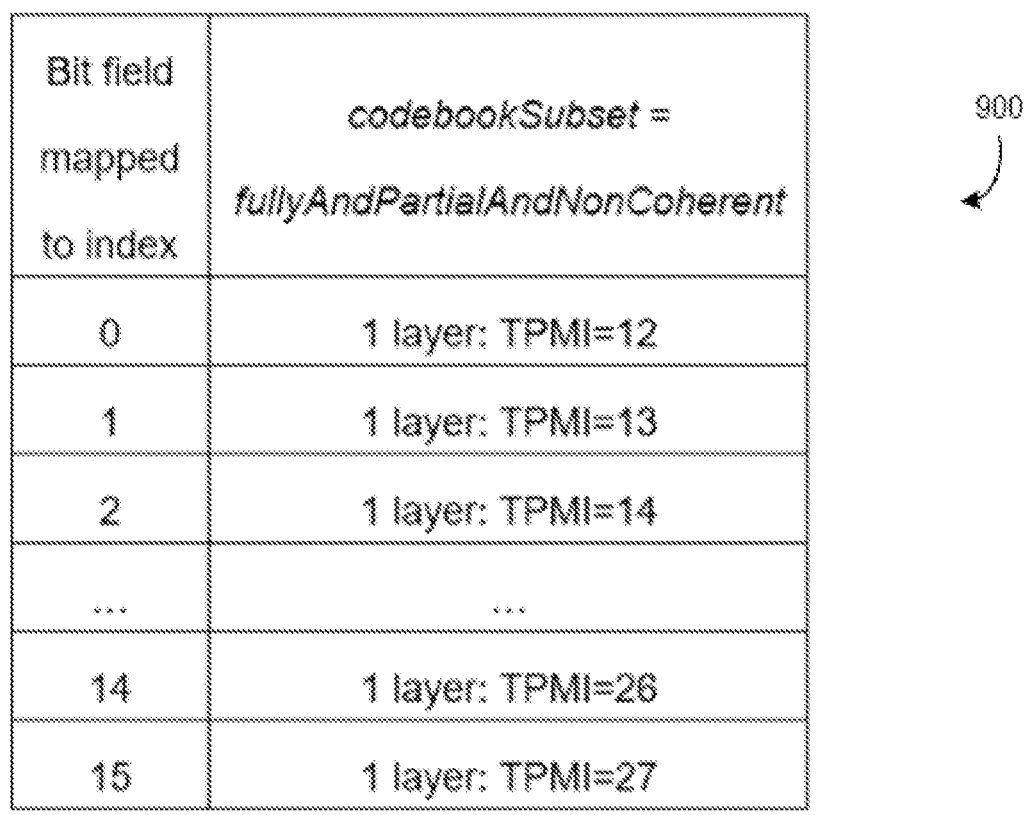
FIG. 9 is an example table illustrating precoding information and a number of layers, according to some embodiments of the present disclosure.

FIG. 5 is an example diagram illustrating a first TPMI field (e.g., an original TPMI field 510) and a second TPMI field (a new TPMI field 520) of DCI 500, according to some embodiments. FIG. 6 is an example table 600 illustrating precoding information and a number of layers, for 4 antenna ports, according to some embodiments. FIG. 7 is an example table 700 illustrating precoding information and a number of layers, for 4 antenna ports, according to some embodiments. FIG. 8 is an example table 800 illustrating precoding information and a number of layers, for 4 antenna ports, according to some embodiments. FIG. 9 is an example table 900 illustrating precoding information and a number of layers, for 4 antenna ports, according to some embodiments.

Referring to FIGS. 1A, 1B, and 5-9, the DCI 500 applies to a UE implementing single-layer transmission (maxRank=1) and having 4 antennas (e.g., 4 antenna ports) that are fully coherent, partial coherent, or non-coherent. The DCI 500 is shown to include the original TPMI field 510 and the new TPMI field 520. The original TPMI field 510 can be used to indicate the first TPMI codeword (denoted as $TPMI_1$), and the new TPMI field 520 can be used to indicate the second TPMI (denoted as $TPMI_2$) codeword.

The table applicable to the original TPMI field 510 can be a table such as but not limited to, the table 600. The table 600 is Table 7.3.1.1.2-3 of 3GPP TS 38.212 version 15.3.0 Release 15. The table 600 corresponding to the original TPMI field 510 can be 5 bits.

In some examples, three tables 700, 800, and 900 can be added for the new TPMI field 520. In particular, the table 700 applies to antenna non-coherent transmissions and has 2 bits. The table 800 applies to antenna partial coherent transmissions and has 3 bits. The table 900 applies to antenna fully coherent transmissions and has 4 bits.

Illustrating with an example in which a UE has 4 non-coherent antennas and implements single layer transmission (e.g., the DCI 500 can be used), the UE can receive, from a base station, the DCI 500 having the original TPMI field 510, the value of which (e.g., a TPMI index) is 1 for 8 uplink PUSCH transmissions (e.g., M=8). The uplink PUSCH transmissions is a sequence of 8 uplink transmissions, from a first PUSCH transmission to an eighth PUSCH transmission. The original TPMI field 510 being 1 corresponds to $TPMI_1=1$, per table 600. Accordingly, the first PUSCH set corresponds to $TPMI_1=1$. Given that the UE has non-coherent antennas, the second TPMI codeword $TPMI_2$ can be selected from the table 700. In the examples in which the new TPMI field 520 contains a value of 3, the second PUSCH set corresponds to $TPMI_2=3$, given that the new TPMI field 520 being 3 corresponds to $TPMI_2=3$, per table 700. Accordingly, the first PUSCH set is transmitted using a precoding matrix corresponding to $TPMI_1=1$, and the second PUSCH set is transmitted using a precoding matrix corresponding to $TPMI_2=3$.

In an example in which the PUSCH transmissions correspond to the same SpatialRelationInfo, the PUSCH set can be divided or grouped using the first grouping method. In that regard, the first PUSCH set (including the first, second, third, and fourth PUSCH transmissions) corresponds to $TPMI_1=1$, and the second PUSCH set (including the fifth, sixth, seventh, and eighth PUSCH transmissions) corresponds to $TPMI_2=3$. The first PUSCH set is transmitted using a precoding matrix corresponding to $TPMI_1=1$, and the second PUSCH set is transmitted using a precoding matrix corresponding to $TPMI_2=3$.

In an example in which the PUSCH transmissions correspond to the same SpatialRelationInfo, the PUSCH set can be divided or grouped using the second grouping method. In that regard, the first PUSCH set (including the first, third, fifth, and seventh PUSCH transmissions) corresponds to $TPMI_1=1$, and the second PUSCH set (including the second, fourth, sixth, and eighth PUSCH transmissions) corresponds to $TPMI_2=3$. The first PUSCH set is transmitted using a precoding matrix corresponding to $TPMI_1=1$, and the second PUSCH set is transmitted using a precoding matrix corresponding to $TPMI_2=3$.

In an example in which the PUSCH transmissions correspond to the same SpatialRelationInfo, and the PUSCH set is divided using the third grouping method, the first PUSCH set (including the first, second, fifth, and sixth PUSCH transmissions) corresponds to $TPMI_1=1$, and the second PUSCH set (including the third, fourth, seventh, and eighth PUSCH transmissions) corresponds to $TPMI_2=3$.

Illustrating with another example in which a UE has 4 partial coherent antennas and implements single layer transmission (e.g., the DCI 500 can be used), the UE can receive, from a base station, the DCI 500 having the original TPMI field 510, the value of which is 4 for 8 uplink PUSCH transmissions (e.g., M=8). The uplink PUSCH transmissions is a sequence of 8 uplink transmissions, from a first PUSCH transmission to an eighth PUSCH transmission. The original TPMI field 510 being 6 corresponds to $TPMI_1=6$, per table 600. Accordingly, the first PUSCH set corresponds to $TPMI_1=6$. Given that the UE has partial coherent antennas, the second TPMI codeword $TPMI_2$ can be selected from the table 800. In the examples in which the new TPMI field 520 contains a value of 1 (corresponding to $TPMI_2=5$, per table 800), the second PUSCH set corresponds to $TPMI_2=5$. Accordingly, the first PUSCH set is transmitted using a precoding matrix corresponding to TPMI=6, and the second PUSCH set is transmitted using a precoding matrix corresponding to TPMI=5.

In some examples in which the PUSCH transmissions correspond to two different SpatialRelationInfo (e.g., a first SpatialRelationInfo and a second SpatialRelationInfo), the first PUSCH set includes PUSCH transmissions (e.g., the first, third, fifth, and seventh PUSCH transmissions) to which the first SpatialRelationInfo is applied, and the second PUSCH set includes PUSCH transmissions (e.g., the second, fourth, sixth, and eight PUSCH transmissions) to which the second SpatialRelationInfo is applied.

In some embodiments, the first TPMI codeword is indicated by the TPMI field in the DCI, and the index value of the second TPMI codeword can be indicated by an offset value X that is offset from the index value of the first TPMI codeword. The offset value X can be configured using signaling protocols such as but not limited to, RRC signaling, MAC CE, and so on. In some embodiments, the offset value X can be configured to ensure that the second TPMI codeword is within a same UE antenna attribute range as that of the first TPMI codeword. That is, in the example in which the first TPMI corresponds to antenna non-coherent, the second TPMI also corresponds to antenna non-coherent. In the example in which the first TPMI is antenna partial coherent, the second TPMI also corresponds to antenna partial coherent. In the example in which the first TPMI is antenna fully coherent, the second TPMI also corresponds to antenna fully coherent. The antenna attribute of the second TPMI is the same as that of the first TPMI. In an example in which a UE has 2 non-coherent antennas configured to single-layer transmission (maxRank=1), the first TPMI codeword and the second TPMI codeword are different.

In an example in which a UE has 2 fully coherent antennas configured to single-layer transmission (maxRank=1), the second TPMI codeword can be determined based on the offset value X and the first TPMI codeword, for example, using expression (1):

$$TPMI_2=(TPMI_1+X) \bmod 5 \qquad (1).$$

In an example in which a UE has 4 non-coherent antennas configured to single-layer transmission (maxRank=1), the second TPMI codeword can be determined based on the offset value X and the first TPMI codeword, for example, using expression (2):

$$TPMI_2=(TPMI_1+X) \bmod 3 \qquad (2).$$

In an example in which a UE has 4 partial coherent antennas configured to single-layer transmission (maxRank=1), the second TPMI codeword can be determined based on the offset value X and the first TPMI codeword, for example, using expression (3):

$$TPMI_2=(TPMI_1+X) \bmod 11 \qquad (3).$$

In an example in which a UE has 4 fully coherent antennas configured to single-layer transmission (maxRank=1), the second TPMI codeword can be determined based on the offset value X and the first TPMI codeword, for example, using expression (4):

$$TPMI_2=(TPMI_1+X) \bmod 27 \qquad (4).$$

The first TPMI codeword ($TPMI_1$) corresponds to the first PUSCH set, and the second TPMI codeword ($TPMI_2$) corresponds to the second PUSCH set.

Illustrating with an example in which a UE has 4 fully coherent antennas configured for single-layer transmissions, the UE can receive, from a base station, a TPMI field index value of 13 (e.g., $TPMI_1=13$) for 8 uplink PUSCH transmissions (e.g., M=8). The UE can receive the offset value (X=5) from the base station, for example, via RRC signaling or MAC CE. $TPMI_2$ is calculated to be 18 using expression (4). As such, the first PUSCH set including some of the 8 uplink PUSCH transmissions corresponds to $TPMI_1=13$, and the second PUSCH set including others of the 8 uplink PUSCH transmissions corresponds to $TPMI_1=18$. In an example in which the PUSCH transmissions correspond to the same SpatialRelationInfo, and the PUSCH set is divided using the second grouping method, the first PUSCH set (including the first, third, fifth, and seventh PUSCH transmissions) corresponds to TPMI=13, and the second PUSCH set (including the second, fourth, sixth, and eighth PUSCH transmissions) corresponds to TPMI=18. Alternatively, other grouping methods (e.g., the first and the third grouping methods) can be applied.

In some embodiments, the first TPMI codeword is indicated by the TPMI field in the DCI, and the second TPMI codeword can be indicated using an antenna port field of the DCI. That is, an index value of the antenna port field is used as an index value of the second TPMI. In some embodiments, the index value of the antenna port field can be configured to ensure that the second TPMI codeword is within a same UE antenna attribute range as that of the first TPMI codeword. The first TPMI codeword corresponds to the first PUSCH set, and the second TPMI codeword corresponds to the second PUSCH set.

FIG. 10 is an example table 1000 illustrating precoding information and a number of layers, for 2 antenna ports, according to some embodiments. FIG. 11 is an example table 1100 illustrating antenna port information, according to some embodiments. Referring to FIGS. 1A, 1B 10, and 11, the table 1000 is a table for antennas configured for maxRank=1. In some examples, the table 1000 applies to a UE implementing single-layer transmission (maxRank=1) and having 2 antennas (e.g., 2 antenna ports) that are fully coherent, partial coherent, or non-coherent. Bit field mapped to index is a TPMI field index (TPMI index). The table 1000 is the Table 7.3.1.1.2-5 of 3GPP TS 38.212 version 15.3.0 Release 15.

The table 1100 corresponds to an antenna port field of the DCI. The table 1100 includes an index value ("value" or antenna port field index value) and information corresponding to the index value, including DeModulation Reference Signal (DMRS) code domain multiplexed (CDM) group(s) and DMRS port(s). The index value of the table 1100 can be used to indicate the second TPMI codeword.

Illustrating with an example in which a UE has 2 non-coherent antennas and implements single layer transmission (e.g., the tables 1000 and 1100 apply) for 8 uplink PUSCH transmissions (e.g., M=8), the UE can receive, from a base station, DCI including a TPMI field index value of 0 (according to the table 1000) and an antenna port field index value (according to the table 1100) of 1. In this example, the first PUSCH set corresponds to the first TPMI codeword (TPMI=0) identified by the TPMI field index value, and the second PUSCH set corresponds to the second TPMI codeword (TPMI=1) identified by the antenna port field index value. In an example in which the PUSCH transmissions correspond to the same SpatialRelationInfo, and the PUSCH set is divided using the third grouping method, the first PUSCH set (including the first, second, fifth, and sixth PUSCH transmissions) corresponds to TPMI=0, and the second PUSCH set (including the third, fourth, seventh, and eighth PUSCH transmissions) corresponds to TPMI=1.

Illustrating with another example in which a UE has 2 fully coherent antennas and implements single layer transmission (e.g., the tables 1000 and 1100 apply) for 8 uplink PUSCH transmissions (e.g., M=8), the UE can receive, from a base station, DCI including a TPMI field index value of 3 (according to the table 1000) and an antenna port field index value (according to the table 1100) which can be any value from 0-5. In the example in which the antenna port field index value is 5, the first PUSCH set corresponds to the first TPMI codeword (TPMI=3) identified by the TPMI field index value, and the second PUSCH set corresponds to the second TPMI codeword (TPMI=5) identified by the antenna port field index value. In some examples in which the PUSCH transmissions correspond to two different SpatialRelationInfo (e.g., a first SpatialRelationInfo and a second SpatialRelationInfo), the first PUSCH set includes PUSCH transmissions (e.g., the first, third, fifth, and seventh PUSCH transmissions) to which the first SpatialRelationInfo is applied, and the second PUSCH set includes PUSCH transmissions (e.g., the second, fourth, sixth, and eight PUSCH transmissions) to which the second SpatialRelationInfo is applied. The first, third, fifth, and seventh PUSCH transmissions are transmitted using the precoding matrix corresponding to TPMI=3. The second, fourth, sixth, and eight PUSCH transmissions are transmitted using the precoding matrix corresponding to TPMI=5.

In some embodiments, the base station indicates the first TPMI codeword using the TPMI field in the DCI, where the base station determines the first TPMI codeword according to measurement report. The base station determines the second TPMI codeword such that the first TPMI codeword and the second TPMI codeword satisfies one of multiple selection methods, including a first selection method, a second selection method, or a third selection method. The first TPMI codeword corresponds to the first PUSCH set, and the second TPMI codeword corresponds to the second PUSCH set.

In the first selection method, in response to determining that the first TPMI codeword (determined based on uplink channel measurement report) enables the UE to perform uplink full power transmission, the base station selects the second TPMI codeword from one or more TPMI codewords that enable the UE to achieve uplink full power transmission. For example, assuming that the power level of the UE is 3 (e.g., power class-3), the uplink full power transmission refers to the transmit power of the antenna port of the UE being 23 dBm.

In the second selection method, in response to determining that the first TPMI codeword (determined based on uplink channel measurement report) cannot allow the UE to perform uplink full power transmission, the base station selects the second TPMI codeword from one or more TPMI codewords that likewise cannot allow the UE to achieve uplink full power transmission.

In the third selection method, regardless of whether the first TPMI codeword allows the UE to perform uplink full power transmission, the base station selects the second TPMI codeword from one or more TPMI codewords that enable the UE to achieve uplink full power transmission.

With respect to a UE has 4 antennas supporting mode 1, non-coherent transmissions utilize TPMI codeword TPMI=13 to support uplink full power transmission, and partial coherent transmissions utilize TPMI codewords TPMI=12-19 to support uplink full power transmission.

Illustrating with an example in which a UE has 4 non-coherent antennas, supports mode 1, and implements single layer transmission for 8 uplink PUSCH transmissions (e.g., M=8), the first TPMI codeword and the second TPMI codeword can be determined using the third selection method. The base station can determine the first TPMI codeword (e.g., TPMI=1) based on uplink channel measurement report received from the UE. The base station can indicate the first TPMI codeword using the TPMI field in the DCI. Regardless of whether the first TPMI codeword (TPMI=1) allows the UE to perform uplink full power transmission, the base station selects the second TPMI codeword (e.g., TPMI=13) from one or more TPMI codewords that enable the UE to achieve uplink full power transmission. In an example in which the PUSCH transmissions correspond to the same SpatialRelationInfo, and the PUSCH set is divided using the second grouping method, the first PUSCH set (including the first, third, fifth, and seventh PUSCH transmissions) corresponds to TPMI=1, and the second PUSCH set (including the second, fourth, sixth, and eighth PUSCH transmissions) corresponds to TPMI=13.

With respect to a UE has 4 antennas supporting mode 2, the UE first reports to the base station the TPMI codewords that support full power transmission.

Illustrating with an example in which a UE has 4 partial coherent antennas, supports mode 2, and implements single layer transmission for 8 uplink PUSCH transmissions (e.g., M=8), the first TPMI codeword and the second TPMI codeword can be determined using the first selection method. The base station can determine the first TPMI codeword (e.g., TPMI=5) based on uplink channel measurement report received from the UE. The base station can indicate the first TPMI codeword using the TPMI field in the DCI. Upon receiving, from the UE, one or more TPMI codewords that support full power transmission for the UE, the base station selects one of the one or more TPMI codewords as the second TPMI codeword (e.g., TPMI=10). In an example in which the PUSCH transmissions correspond to the same SpatialRelationInfo, and the PUSCH set is divided using the second grouping method, the first PUSCH set (including the first, third, fifth, and seventh PUSCH transmissions) corresponds to TPMI=5, and the second PUSCH set (including the second, fourth, sixth, and eighth PUSCH transmissions) corresponds to TPMI=10.

In some embodiments, the TPMI of the PUSCH is polled according to a TPMI sequence or order. In some examples of codebook-based uplink transmissions, a maximum number of transmission layers supported by the UE is 1. The base station instructs the UE to perform M uplink PUSCH transmissions with N different TPMI codewords. The N TPMI codewords correspond to different PUSCH sets of the M uplink PUSCH transmissions. In the case that the PUSCH transmissions correspond to the same SpatialRelationInfo, the different PUSCH sets include only one PUSCH set (referred to as the first PUSCH set) which includes all M PUSCH transmissions. In the case that the PUSCH transmissions correspond to two different SpatialRelationInfo (e.g., a first SpatialRelationInfo and a second SpatialRelationInfo), the different PUSCH sets include a first PUSCH set and a second PUSCH set, where the first PUSCH set includes PUSCH transmissions to which the first SpatialRelationInfo is applied, and the second PUSCH set includes PUSCH transmissions to which the second SpatialRelationInfo is applied.

In some embodiments, after determining a number of UE antennas, antenna attributes, a number of layers, and waveforms for uplink transmission for a given UE, the base station can determine the TPMI codewords corresponding to the number of UE antennas, antenna attributes, number of layers, and waveforms. The TPMI codewords can be determined using a codebook table. The base station can determine a TPMI codeword range, for example, using one of multiple TPMI codeword range determination methods, including a first TPMI codeword range determination method and a second TPMI codeword range determination method.

In the first TPMI codeword range determination method, the codeword range is determined based on the UE antenna attributes. In an example in which the UE includes an antenna having fully coherent transmission capabilities, the UE can select one TPMI codeword among multiple TPMI codewords that correspond to fully coherent antennas and cannot select any TPMI codewords corresponding to partially coherent or non-coherent antennas.

In the second TPMI codeword range determination method, the codeword range is determined based on classification in the TPMI codebook table. That is, the codeword range can be determined based on different codebook tables or codebook tables having different designated classifications. In an example in which the UE includes an antenna having fully coherent transmission capabilities, the UE can select one TPMI codeword among TPMI codewords that correspond to fully coherent, partially coherent, and non-coherent antennas.

The base station can determine the first TPMI codeword based on uplink channel measurement report, and indicate the first TPMI codeword using the TPMI field of the DCI. In some embodiments, subsequent N−1 TPMI codewords (e.g., N−1 TPMI codewords following the first TPMI codewords)

can be determined by polling. In the example in which the PUSCH transmissions correspond to the same SpatialRelationInfo, the DCI indicates the first TPMI corresponding to the first PUSCH in the first PUSCH set. The N−1 TPMI codewords corresponding to the next M−1 PUSCH transmissions are sequentially selected in the codebook table, where the N−1 TPMI codewords are within the determined TPMI codeword range.

Figure 12:
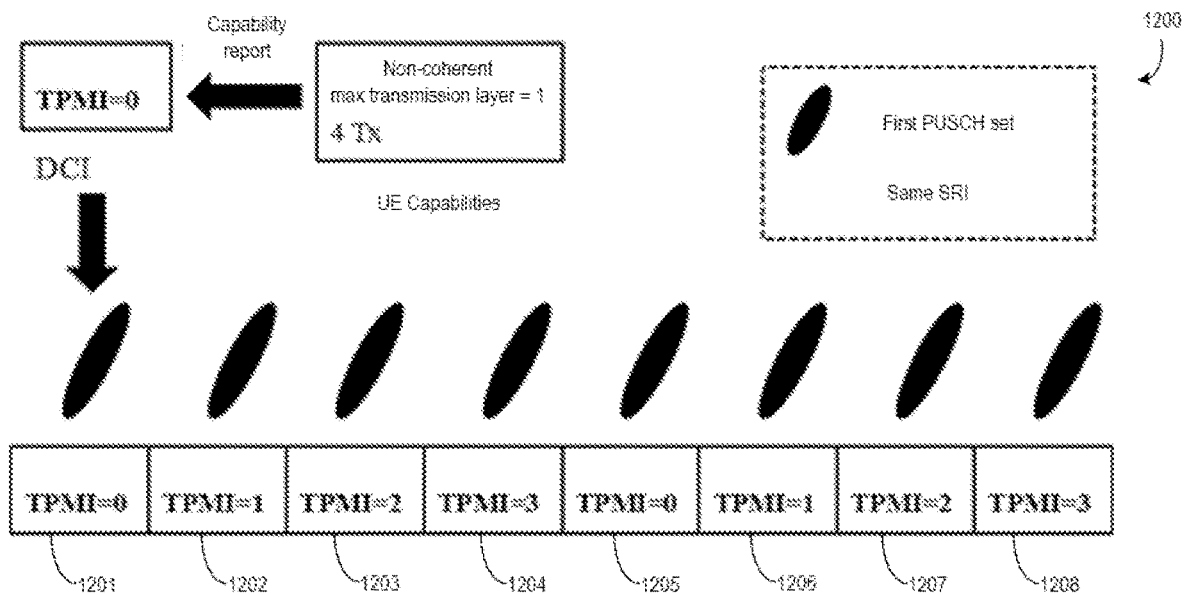
FIG. 12 is a diagram illustrating PUSCH transmissions, according to some embodiments of the present disclosure.

In that regard, FIG. 12 is a diagram illustrating a transmission scheme 1200 for PUSCH transmissions 1201-1208, according to some embodiments. Referring to FIGS. 1A, 1B, and 12, the transmission scheme 1200 applies to a UE implementing single-layer transmission (maxRank=1) and having 4 antennas (e.g., 4 antenna ports) that are non-coherent. The UE transmits 8 uplink PUSCH transmissions (e.g., M=8), including PUSCH transmission 1201, PUSCH transmission 1202, PUSCH transmission 1203, PUSCH transmission 1204, PUSCH transmission 1205, PUSCH transmission 1206, PUSCH transmission 1207, and PUSCH transmission 1208.

In the transmission scheme 1200, the PUSCH transmissions correspond to the same SpatialRelationInfo. In this case, the TPMI codeword range (including TPMI=0, TPMI=1, TPMI=2, and TPMI=3) determined using the first TPMI codeword range determination method and the second TPMI codeword range determination method is the same. Therefore, the TPMI codeword range includes the N TPMI codewords, where N=4. In the example, the base station sends the DCI with the TPMI field index being 0 (e.g., TPMI=0) as the first TPMI corresponding to the first PUSCH (e.g., the PUSCH transmission 1201) in the first PUSCH set. For the next M−1 PUSCH transmissions 1202-1208, the TPMI codewords in the TPMI codeword range are assigned in sequence. That is, the PUSCH transmission 1202 corresponds to TPMI=1. The PUSCH transmission 1203 corresponds to TPMI=2. The PUSCH transmission 1204 corresponds to TPMI=3. The PUSCH transmission 1205 corresponds to TPMI=0. The PUSCH transmission 1206 corresponds to TPMI=1. The PUSCH transmission 1207 corresponds to TPMI=2. The PUSCH transmission 1208 corresponds to TPMI=3.

In some examples in which the PUSCH transmissions correspond to different SpatialRelationInfo, the correspondence between the PUSCH set and the TPMI codewords can be determined using one of multiple mapping methods, including a first mapping method and a second mapping methods.

In the first mapping method, DCI indicates a first TPMI codeword (e.g., via the TPMI field in the DCI). The first TPMI codeword is assigned or mapped to all PUSCH transmissions in the first PUSCH set and the first PUSCH transmission in the second PUSCH set. The TPMI codewords assigned or mapped to the remaining PUSCH transmissions of the second PUSCH set are sequentially selected from the codebook table, where such TPMI codewords are within the TPMI codeword range.

In the second mapping method, DCI indicates a first TPMI codeword (e.g., via the TPMI field in the DCI). The first TPMI codeword is assigned or mapped to the first PUSCH transmission in the first PUSCH set and the first PUSCH transmission in the second PUSCH set. The TPMI codewords assigned or mapped to the remaining PUSCH transmissions of the first and second PUSCH sets are sequentially selected from the codebook table, where such TPMI codewords are within the TPMI codeword range.

Figure 13:
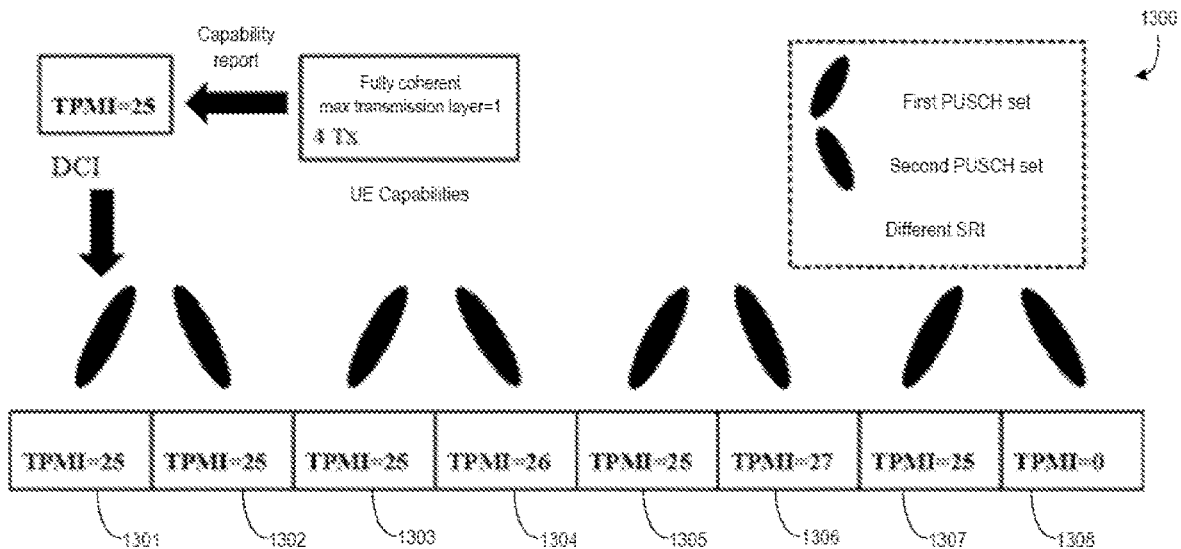
FIG. 13 is a diagram illustrating PUSCH transmissions, according to some embodiments of the present disclosure.

In that regard, FIG. 13 is a diagram illustrating a transmission scheme 1300 for PUSCH transmissions 1301-1308, according to some embodiments. Referring to FIGS. 1A, 1B, and 13, the transmission scheme 1300 applies to a UE implementing single-layer transmission (maxRank=1) and having 4 antennas (e.g., 4 antenna ports) that are fully coherent. The UE transmits 8 uplink PUSCH transmissions (e.g., M=8), including PUSCH transmission 1301, PUSCH transmission 1302, PUSCH transmission 1303, PUSCH transmission 1304, PUSCH transmission 1305, PUSCH transmission 1306, PUSCH transmission 1307, and PUSCH transmission 1308.

In the transmission scheme 1300, the PUSCH transmissions correspond to different SpatialRelationInfo. For example, the first SpatialRelationInfo corresponds to the PUSCH transmissions 1301, 1303, 1305, and 1307, which form the first PUSCH set. The second SpatialRelationInfo corresponds to the PUSCH transmissions 1302, 1304, 1306, and 1308, which form the second PUSCH set. In this example, the TPMI codeword range (including TPMI=0-27) can be determined using the second TPMI codeword range determination method. In the example, the base station sends the DCI with the TPMI field index being 25 (e.g., TPMI=25) as the first TPMI. The base station determines TPMI=25 based on the UE capabilities report received from the UE, where the UE capabilities report indicates that the UE implementing single-layer transmission (maxRank=1) and having 4 antennas (e.g., 4 antenna ports) that are fully coherent. According to the first mapping method, the PUSCH transmissions 1301, 1303, 1305, and 1307 in the first PUSCH set and the first PUSCH transmission 1302 in the second PUSCH set are mapped to TPMI=25. The remaining PUSCH transmissions 1304, 1306, and 1308 in the second PUSCH set are assigned to TPMI codewords sequentially, following TPMI=25. That is, the PUSCH transmissions 1304, 1306, and 1308 are mapped to TPMI=26, TPMI=27, and TPMI=0, respectively.

Figure 14:
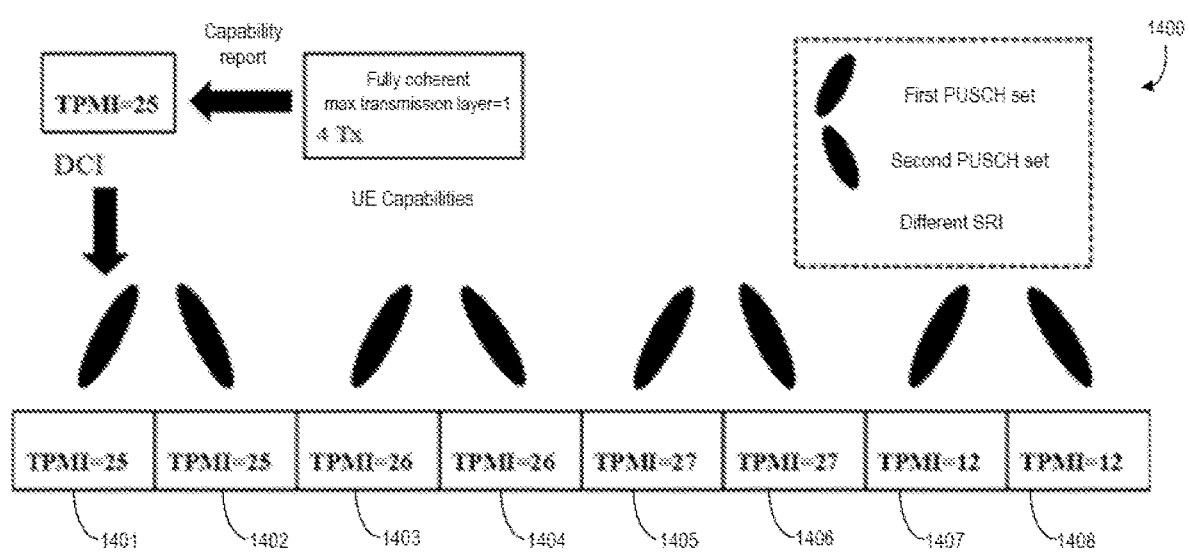
FIG. 14 is a diagram illustrating PUSCH transmissions, according to some embodiments of the present disclosure.

In addition, FIG. 14 is a diagram illustrating a transmission scheme 1400 for PUSCH transmissions 1401-1408, according to some embodiments. Referring to FIGS. 1A, 1B, and 14, the transmission scheme 1400 applies to a UE implementing single-layer transmission (maxRank=1) and having 4 antennas (e.g., 4 antenna ports) that are fully coherent. The UE transmits 8 uplink PUSCH transmissions (e.g., M=8), including PUSCH transmission 1401, PUSCH transmission 1402, PUSCH transmission 1403, PUSCH transmission 1404, PUSCH transmission 1405, PUSCH transmission 1406, PUSCH transmission 1407, and PUSCH transmission 1408.

In the transmission scheme 1400, the PUSCH transmissions correspond to different SpatialRelationInfo. For example, the first SpatialRelationInfo corresponds to the PUSCH transmissions 1401, 1403, 1405, and 1407, which form the first PUSCH set. The second SpatialRelationInfo corresponds to the PUSCH transmissions 1402, 1404, 1406, and 1408, which form the second PUSCH set. In this example, the TPMI codeword range (including TPMI=12-27) can be determined using the first TPMI codeword range determination method. In the example, the base station sends the DCI with the TPMI field index being 25 (e.g., TPMI=25) as the first TPMI. The base station determines TPMI=25 based on the UE capabilities report received from the UE, where the UE capabilities report indicates that the UE implementing single-layer transmission (maxRank=1) and having 4 antennas (e.g., 4 antenna ports) that are fully coherent. According to the second mapping method, the PUSCH transmissions 1401 in the first PUSCH set and the first PUSCH transmission 1402 in the second PUSCH set are mapped to TPMI=25. The remaining PUSCH transmissions 1403, 1405, and 1407 of the first PUSCH set and the remaining PUSCH transmissions 1404, 1406, and 1408 in the second PUSCH set are assigned to TPMI codewords sequentially, following TPMI=25. That is, the PUSCH transmissions 1403-1408 are mapped to TPMI=26, TPMI=26, TPMI=27, TPMI=27, TPMI=12, and TPMI=12, respectively.

Figure 15B:
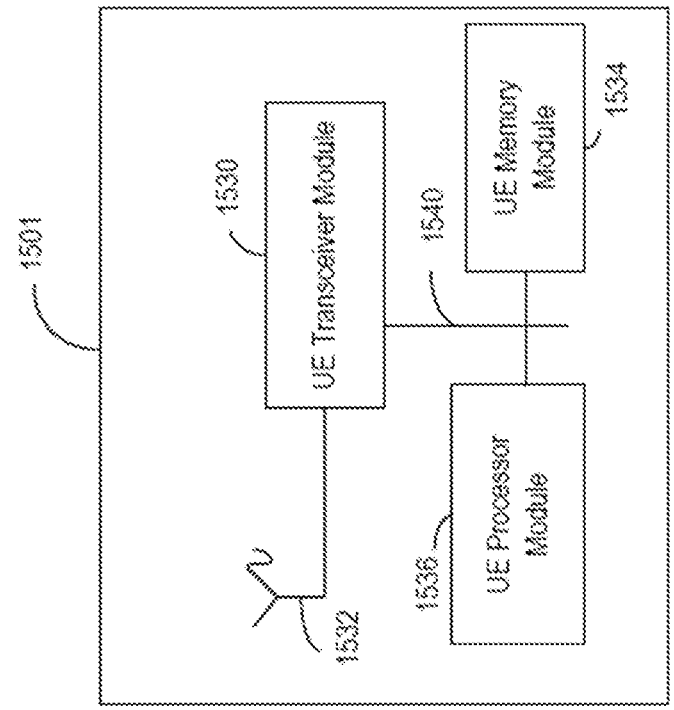
FIG. 15B illustrates a block diagram of an example user equipment (UE), in accordance with some embodiments of the present disclosure.
Figure 15A:
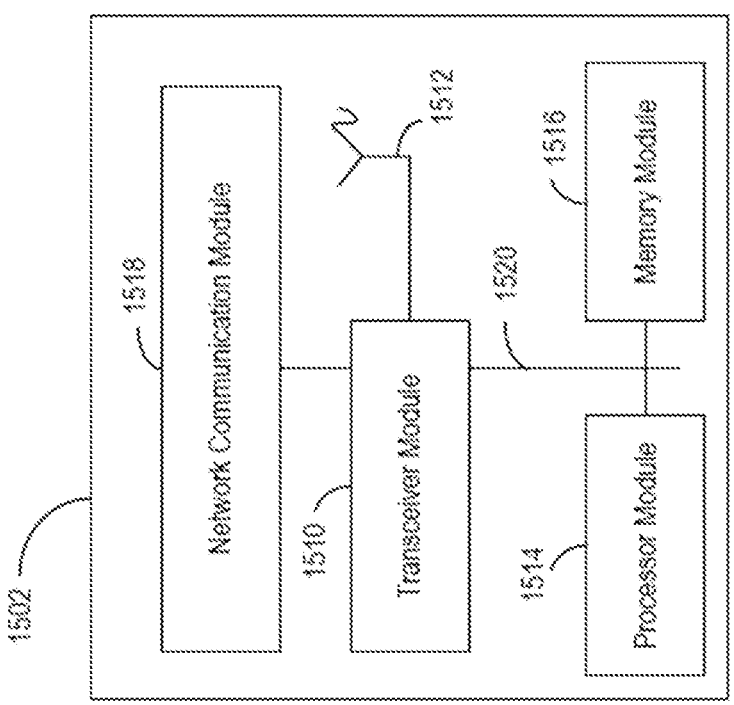
FIG. 15A illustrates a block diagram of an example base station, in accordance with some embodiments of the present disclosure.

FIG. 15A illustrates a block diagram of an example base station 1502, in accordance with some embodiments of the present disclosure. FIG. 15B illustrates a block diagram of an example UE 1501, in accordance with some embodiments of the present disclosure. Referring to FIGS. 1A-15B, the UE 1501 (e.g., a wireless communication device, a terminal, a mobile device, a mobile user, and so on) is an example implementation of the UEs described herein, and the base station 1502 is an example implementation of the base station described herein.

The base station 1502 and the UE 1501 can include components and elements configured to support known or conventional operating features that need not be described in detail herein. In one illustrative embodiment, the base station 1502 and the UE 1501 can be used to communicate (e.g., transmit and receive) data symbols in a wireless communication environment, as described above. For instance, the base station 1502 can be a base station (e.g., gNB, eNB, and so on), a server, a node, or any suitable computing device used to implement various network functions.

The base station 1502 includes a transceiver module 1510, an antenna 1512, a processor module 1514, a memory module 1516, and a network communication module 1518. The module 1510, 1512, 1514, 1516, and 1518 are operatively coupled to and interconnected with one another via a data communication bus 1520. The UE 1501 includes a UE transceiver module 1530, a UE antenna 1532, a UE memory module 1534, and a UE processor module 1536. The modules 1530, 1532, 1534, and 1536 are operatively coupled to and interconnected with one another via a data communication bus 1540. The base station 1502 communicates with the UE 1501 or another base station via a communication channel, which can be any wireless channel or other medium suitable for transmission of data as described herein. In some examples, the UE antenna 1532 includes multiple (e.g., 2, 4, 6, and so on) antennas capable of non-coherent transmission/reception, partial coherent transmission/reception, or fully coherent transmission/reception. In some examples, the antenna 1512 is capable of communicating with the UE antenna 1532 using non-coherent transmission/reception, partial coherent transmission/reception, or fully coherent transmission/reception.

As would be understood by persons of ordinary skill in the art, the base station 1502 and the UE 1501 can further include any number of modules other than the modules shown in FIGS. 15A and 15B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1530 includes a radio frequency (RF) transmitter and a RF receiver each including circuitry that is coupled to the antenna 1532. A duplex switch (not shown) may alternatively couple the RF transmitter or receiver to the antenna in time duplex fashion. Similarly, in accordance with some embodiments, the transceiver 1510 includes an RF transmitter and a RF receiver each having circuitry that is coupled to the antenna 1512 or the antenna of another base station. A duplex switch may alternatively couple the RF transmitter or receiver to the antenna 1512 in time duplex fashion. The operations of the two transceiver modules 1510 and 1530 can be coordinated in time such that the receiver circuitry is coupled to the antenna 1532 for reception of transmissions over a wireless transmission link at the same time that the transmitter is coupled to the antenna 1512. In some embodiments, there is close time synchronization with a minimal guard time between changes in duplex direction.

The UE transceiver 1530 and the transceiver 1510 are configured to communicate via the wireless data communication link, and cooperate with a suitably configured RF antenna arrangement 1512/1532 that can support a particular wireless communication protocol and modulation scheme. In some illustrative embodiments, the UE transceiver 1510 and the transceiver 1510 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1530 and the base station transceiver 1510 may be configured to support alternate, or additional, wireless data communication protocols, including future standards or variations thereof.

The transceiver 1510 and the transceiver of another base station (such as but not limited to, the transceiver 1510) are configured to communicate via a wireless data communication link, and cooperate with a suitably configured RF antenna arrangement that can support a particular wireless communication protocol and modulation scheme. In some illustrative embodiments, the transceiver 1510 and the transceiver of another base station are configured to support industry standards such as the LTE and emerging 5G standards, and the like. It is understood, however, that the present disclosure is not necessarily limited in application to a particular standard and associated protocols. Rather, the transceiver 1510 and the transceiver of another base station may be configured to support alternate, or additional, wireless data communication protocols, including future standards or variations thereof.

In accordance with various embodiments, the base station 1502 may be a base station such as but not limited to, an eNB, a serving eNB, a target eNB, a femto station, or a pico station, for example. The base station 1502 can be an RN, a regular, a DeNB, a gNB, or an IAB donor. In some embodiments, the UE 1501 may be embodied in various types of user devices such as a mobile phone, a smart phone, a personal digital assistant (PDA), tablet, laptop computer, wearable computing device, etc. The processor modules 1514 and 1536 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1514 and 1536, respectively, or in any practical combination thereof. The memory modules 1516 and 1534 may be realized as RAM memory, flash memory, ROM memory, EPROM memory, EEPROM memory, registers, a hard disk, a removable disk, a CD-ROM, or any other form of storage medium known in the art. In this regard, memory modules 1516 and 1534 may be coupled to the processor modules 1510 and 1530, respectively, such that the processors modules 1510 and 1530 can read information from, and write information to, memory modules 1516 and 1534, respectively. The memory modules 1516 and 1534 may also be integrated into their respective processor modules 1510 and 1530. In some embodiments, the memory modules 1516 and 1534 may each include a cache memory for storing temporary variables or other intermediate information during execution of instructions to be executed by processor modules 1510 and 1530, respectively. Memory modules 1516 and 1534 may also each include non-volatile memory for storing instructions to be executed by the processor modules 1510 and 1530, respectively.

The network communication module 1518 generally represents the hardware, software, firmware, processing logic, and/or other components of the base station 1502 that enable bi-directional communication between the transceiver 1510 and other network components and communication nodes in communication with the base station 1502. For example, the network communication module 1518 may be configured to support internet or WiMAX traffic. In a deployment, without limitation, the network communication module 1518 provides an 802.3 Ethernet interface such that the transceiver 1510 can communicate with a conventional Ethernet based computer network. In this manner, the network communication module 1518 may include a physical interface for connection to the computer network (e.g., Mobile Switching Center (MSC)). In some embodiments in which the base station 1502 is an IAB donor, the network communication module 1518 includes a fiber transport connection configured to connect the base station 1502 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   sending, by a base station to a wireless communication device, a first number of Transmitted Precoding Matrix Indicators (TPMI) codewords that maps to a second number of codebook-based uplink transmission repetitions of the wireless communication device, the first number being greater than 1, the second number being greater than 1; and
   receiving, by the base station from the wireless communication device, the codebook-based uplink transmission repetitions transmitted based on the TPMI codewords,
   wherein the base station sends the TPMI codewords in Downlink Control Information (DCI), the DCI comprising a first field containing a value for the first TPMI codeword and a second field containing a value for the second TPMI codeword, and
   wherein:
   the second field corresponds to a plurality of tables; the plurality of tables correspond to different antenna attributes of the wireless communication device;
   the antenna attributes comprise one of non-coherent, partially coherent, or fully coherent; and
   the second TPMI codeword corresponds to the antenna attributes of the wireless communication device.

2. The method of claim 1, wherein
   the TPMI codewords correspond to TPMIs used in uplink transmission repetitions in frequency domain; or
   the TPMI codewords correspond to TPMIs used in uplink transmission repetitions in time domain.

3. The method of claim 1, wherein the first number of TPMI codewords comprises a first TPMI codeword and a second TPMI codeword, and the method further comprising determining a mapping between the first number of TPMI codewords and the second number of codebook-based uplink transmission repetitions by determining at least one of:
   a first half of the uplink transmission repetitions are mapped to the first TPMI codeword, and a second half of the uplink transmission repetitions are mapped to the second TPMI codeword; or
   odd uplink transmission repetitions are mapped to the first TPMI codeword; or
   the first and second uplink transmission repetitions are mapped to the first TPMI codeword, the third and fourth uplink transmission repetitions are mapped to the second TPMI codeword, and a rest of uplink transmission repetitions have the same mapping rules with the former uplink transmission repetitions.

4. The method of claim 1, wherein
   the first number is 2; and
   a maximum uplink transmission layer is 1.

5. The method of claim 4, wherein
   the base station indicates the TPMI codewords using a TPMI field corresponding to a code point; and
   the code point indicates two different TPMI codewords.

6. The method of claim 4, further comprising, for the wireless communication device having 4 antennas, grouping available TPMI codewords into a first TPMI group and a second TPMI group, wherein
   the first TPMI codeword and the second TPMI codeword are both from the first TPMI group or the second TPMI group; or
   the first TPMI codeword is from the first TPMI group, and the second TPMI codeword is from the second TPMI group.

7. The method of claim 6, wherein
   the available TPMI codewords are grouped according to index values for the available TPMI codewords;
   for antenna non-coherent transmissions and antenna partial coherent transmissions, a first half of the index values are grouped in the first TPMI group, and a second half of the index values are grouped in the second TPMI group; and
   for antenna fully coherent transmissions, the first TPMI group comprises alternating groups of two adjacent TPMI index values, and the second TPMI group comprises other alternating groups of two adjacent TPMI index values.

8. The method of claim 1, wherein
   the TPMI codewords comprise a first TPMI codeword and one or more second TPMI codewords; and
   the one or more second TPMI codewords are selected within a TPMI codeword range.

9. The method of claim 8, wherein the TPMI codeword range is determined based on the antenna attributes of the wireless communication device or classification in a TPMI codebook table.

10. The method of claim 1, wherein
the uplink transmission repetitions are Physical Uplink Shared Channel (PUSCH) transmission repetitions.

11. A base station, comprising:
at least one processor configured to:
    send, via a transceiver to a wireless communication device, a first number of Transmitted Precoding Matrix Indicators (TPMI) codewords that maps to a second number of codebook-based uplink transmission repetition of the wireless communication device, the first number being greater than 1, the second number being greater than 1; and
    receive, via the transceiver from the wireless communication device, the codebook-based uplink transmission repetition transmitted based on the TPMI codewords,
    wherein the base station sends the TPMI codewords in Downlink Control Information (DCI), the DCI comprising a first field containing a value for the first TPMI codeword and a second field containing a value for the second TPMI codeword, and
    wherein:
        the second field corresponds to a plurality of tables;
        the plurality of tables correspond to different antenna attributes of the wireless communication device;
        the antenna attributes comprise one of non-coherent, partially coherent, or fully coherent; and
        the second TPMI codeword corresponds to the antenna attributes of the wireless communication device.

12. A wireless communication method, comprising:
receiving, by a wireless communication device from a base station, a first number of Transmitted Precoding Matrix Indicators (TPMI) codewords that maps to a second number of codebook-based uplink transmission repetitions of the wireless communication device, the first number being greater than 1, the second number being greater than 1; and
sending, by the wireless communication device to the base station, the codebook-based uplink transmission repetitions transmitted based on the TPMI codewords,
wherein the base station sends the TPMI codewords in Downlink Control Information (DCI), the DCI comprising a first field containing a value for the first TPMI codeword and a second field containing a value for the second TPMI codeword, and
wherein:
    the second field corresponds to a plurality of tables;
    the plurality of tables correspond to different antenna attributes of the wireless communication device;
    the antenna attributes comprise one of non-coherent, partially coherent, or fully coherent; and
    the second TPMI codeword corresponds to the antenna attributes of the wireless communication device.

13. A wireless communication device, comprising a process configured to:
receive from a base station a first number of Transmitted Precoding Matrix Indicators (TPMI) codewords that maps to a second number of codebook-based uplink transmission repetitions of the wireless communication device, the first number being greater than 1, the second number being greater than 1; and
send, to the base station, the codebook-based uplink transmission repetitions transmitted based on the TPMI codewords,
wherein the base station sends the TPMI codewords in Downlink Control Information (DCI), the DCI comprising a first field containing a value for the first TPMI codeword and a second field containing a value for the second TPMI codeword, and
wherein:
    the second field corresponds to a plurality of tables;
    the plurality of tables correspond to different antenna attributes of the wireless communication device;
    the antenna attributes comprise one of non-coherent, partially coherent, or fully coherent; and
    the second TPMI codeword corresponds to the antenna attributes of the wireless communication device.

\* \* \* \* \*